March 5, 1940. C. P. WALKER Re. 21,383

METHOD OF DETERMINING FLUID DENSITY, FLUID PRESSURE, AND THE PRODUCTION CAPACITY OF OIL WELLS

Original Filed Oct. 26, 1937

INVENTOR.
CRANFORD P. WALKER

BY Harold W. Mattingly
ATTORNEY.

Reissued Mar. 5, 1940

Re. 21,383

UNITED STATES PATENT OFFICE 21,383

METHOD OF DETERMINING FLUID DENSITY, FLUID PRESSURE, AND THE PRODUCTION CAPACITY OF OIL WELLS

Cranford P. Walker, San Marino, Calif.

Original No. 2,161,733, dated June 6, 1939, Serial No. 268,805, April 19, 1939, which is a continuation of Serial No. 171,170, October 26, 1937. Application for reissue December 4, 1939, Serial No. 307,551

11 Claims. (Cl. 73—51)

My invention relates to methods of determining the fluid density, fluid pressure and potential production capacity of oil wells and has particular reference to methods of determining the most desirable character of pumping equipment and manner of operating the same to permit an efficient production of oil from a given well.

This application is a continuation of my copending application Serial No. 171,170, filed October 26, 1937.

It is the common practice in oil well production activity to permit an oil well to produce as a flowing well, that is, to permit the oil to flow out at the ground surface due to the pressure in the oil formations, until the production rate reaches a considerably low value or ceases, after which gas lifting is usually attempted and continued until the production rate with gas lifting reaches a relatively low value or the production entirely ceases. At this time, and in some instances prior to any attempt to gas lift the oil, mechanical pumping devices are usually installed to lift the oil by mechanical means to the surface, these pumps usually comprising a pump barrel located at a considerable depth in the well, usually 50 to 150 feet below the surface of the well fluid in the well while it is producing, plungers or other reciprocating devices being employed in the barrel and operated from the ground surface by means of sucker rods.

Usually the selection of the size and character of the pumping equipment is determined by the production of the well during its flowing or gas lifting life by estimating from this production the type or character of pump which appears to be most suitable. In many fields, however, the type, size and character of the pump installed is usually one determined as "standard" for that particular type of well in the particular field. In other words it is one having the same dimensions as pumps in other wells producing from the same horizon. Frequently, such well receives no further attention until the field as a whole has declined to a point where it becomes necessary to increase the production from the wells, as for example, by the encroachment of water, necessitating the lifting of greater quantities of liquid in order to obtain the desired amount of oil. When this condition occurs, it is customary to increase the capacity of the pumping equipment.

Also, the production from a given well may be believed to be less than the character of the well and the character of the pumping equipment employed should indicate, as for example, the pump may be operating at a relatively low volumetric efficiency. As is well understood, the column of well fluid extending up into the well bore is a mixture of dense oil and gas entrained therewith and the maximum volumetric efficiency of the conventional pumping equipment is attained when the pump inlet is located along this column at such place as will permit a maximum amount of dense liquid to flow into the pump upon each stroke. Thus if the pressure in the column at any point below the surface of the column can be determined, the pump inlet may be so properly located as to allow it to take in a minimum quantity of gas upon each stroke. At this point it should be noted that wherever in the following description the expression "fluid", "fluid surface", "fluid level", are used, the word "fluid" is intended to refer to the natural well fluid which comprises a mechanical mixture of dense liquid, (either oil or oil and water) with such quantities of gas entrained therein as may be present in the particular well under consideration.

In order to determine whether or not any change in the size, character, operating characteristics or location of the pumping apparatus should be made, it is desirable that the location of the fluid surface, the character of the fluid in the well, its density and the fluid pressure exerted at any given point below the surface of the fluid and the maximum potential production capacity of the well should be determined. For example, if the pumps in a particular field are operating at good volumetric efficiency, much can be determined from the quantity of oil produced and the volumetric displacement per stroke of the pump, and if the pumps are operating at their maximum capacity, the fact that the fluid level is at a considerable distance above the pump inlet may indicate that the operator is justified in making a change in the size or character of the pumping equipment. Again, if the volumetric efficiency of the pump is found to be low, as for example, when the pump appears to be taking in a comparatively large quantity of gas upon each stroke of the pump, the operator should know whether or not the inlet of the pump is located at a point too near the fluid surface to that he may determine how far below the fluid surface he should lower the pump in order to allow it to receive dense fluid for the full stroke.

Frequently in wells where the quantity of gas produced by the well is relatively small, an increased production of the pump may be obtained by raising the pump to a point nearer the fluid surface so that a better separation of the gas takes place prior to the entry of the fluid into the pump, while if the well is making a large quantity of gas, it may be better to lower the pump to a point below where free gas enters the well bore, if this is possible, so that upon each stroke of the pump, dense liquid will be picked up. However, in many instances, it is dangerous to lower the pump too close to the bottom as sand is likely to be pumped into and foul the pump.

In wells where the fluid level is so low that the pump is not completely submerged and hence does not receive a full cylinder, or barrel of fluid upon each stroke, a pounding at the pump is created which may be heard or determined at the ground surface. This same character of pounding, however, may be produced by the pump even though the fluid surface is at a considerable distance above the pump inlet, occasioned by the inflow into the pump of large quantities of free gas. Hence, simple tests to determine the fluid level relative to the pump inlet will show which of these two conditions exists but will not produce the desired information to the operator as to the desirable character or location of the pumping mechanism.

If, however, the fluid pressure at different levels below the surface of the fluid is determined, this information may be employed to determine the most desirable location of the pump and whether or not a change should be made in the size, operating characteristics or character of the pumping equipment employed in a given well to produce an increased or maximum production from the well.

The determination of the fluid pressure at different points below the surface of the well fluid may be determined by instruments known as pressure recorders, which must be either attached to the pump or lowered into the well to the desired level, or must be lowered into the well on wires, cables or other supporting devices and left at the desired levels for a predetermined length of time necessary to permit the recorders to make a chart or record of the pressures encountered. All of these methods, however, required the stopping of the pumps and the stopping of production while the test is being made and further required the removal of the pumps and sucker rods and sometimes the tubing and other apparatus from the well in order to insert the pressure recorders or pressure measuring devices, which entailed considerable labor and time and held up the production of the well for a considerable period of time.

It is therefore an object of my invention to provide methods for determining the fluid pressure at any given point below the surface of the column of well fluid which extends up into the space between the casing and the pump tubing (known as the "standing column"), determining the density of the fluid in such column and the production index of the well without interrupting or interfering with the production of the well by the usual pumping apparatus employed therein.

Another object of my invention is to provide a ready means for determining the fluid pressure at any level below the surface of the standing column of fluid in the well and for determining the density of the well fluid in any particular well without necessitating the removal or replacement of any of the usual pumping apparatus, flow tubes, sucker rods or other mechanism found in a well being produced by a mechanical pump.

Another object of my invention is to provide information to aid in the determining of the proper location of the pump in an oil well to achieve the maximum volumetric efficiency of the pump in handling the particular character of well fluid found in the particular well.

Another object of my invention is to provide a ready method for determining the potential production capacity of an oil well with a minimum of expense, delay or interruption of the production activities of the well.

Another object of my invention is to provide a method of determining the density of the fluid in a well by measuring the amount of recession of the level of the fluid surface under two or more conditions of pressure upon the fluid surface and computing from the facts thus obtained the density of the fluid in the well. Fluid densities in producing wells range all the way from less than .04 pound per square inch to over .4 pound per square inch per foot of fluid in the well. Therefore, a simple fluid level determination without a density or pressure determination gives very little information.

Another object of my invention is to provide a ready method for determining the potential production capacity of a well by measuring the pressure at the pump inlet under two conditions of operation of the pump and computing therefrom the maximum potential production obtainable from the well.

Another object of my invention is to provide a ready method for determining the potential production capacity of a well by determining the fluid pressure at some point below the fluid surface in the well, either at the pump inlet or any other location, under two conditions of production from the well (one of which may be zero production), and by comparing the pressures so determined with the production rates, determining the maximum potential production obtainable from the well.

Other objects of my invention will be apparent from a study of the following specification read in connection with the accompanying drawing, wherein Fig. 1 is a diagrammatic, cross-sectional view of a typical oil well, illustrating the level of the fluid surface as being located a considerable distance above the inlet of the pumping apparatus employed;

Figure 4:
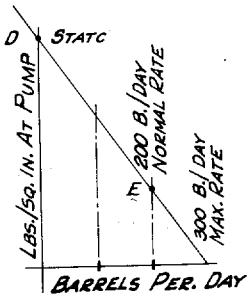
Figure 5:
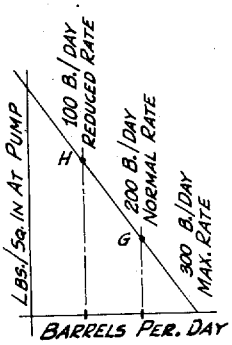

Fig. 4 is a diagrammatic view illustrating a chart or graph which may be employed to compute the maximum potential capacity of a well from a comparison of the pressure at the pump while it is idle with the pressure at the pump while it is operating normally; and Fig. 5 is a view similar to Fig. 4 illustrating the manner in which a more accurate computation of the potential capacity of a well may be obtained by comparing the pressure at the pump under two production rates of the pumping apparatus.

Figure 1:
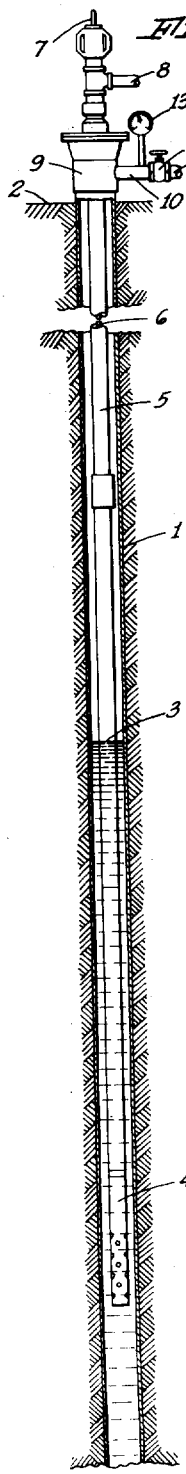

Referring to the drawing, I have illustrated in Fig. 1 a typical oil well which includes a casing 1 extending down through the well bore from the ground surface 2 into the oil producing sands, the oil flowing from the sands or oil formation into the casing and rising in the casing to some level indicated at 3. Pumping apparatus employed to remove the oil from the well usually includes a suitable pump 4 located upon tubing string 5, constituting the flow tubing through which the oil is raised to the ground surface, the pump 4 including usually some reciprocating mechanism operated by reciprocal movements of a string of sucker rods 6 extending down through the tubing 5 and connected to reciprocating power apparatus at the ground surface, as indicated at 7. The flow tubing 5 is provided with an outlet 8 communicating with a suitable oil line through which the oil pumped from the well is conveyed to any desired location.

The casing 1 is closed at its upper end as indicated at 9, an outlet 10 being provided communicating with the casing 1 to permit gas escaping from the oil to pass into a suitable gas line 11, a control valve 12 being usually provided to control the flow of gas into the gas line.

By properly selecting the size, the stroke and the speed of the pump 4, the pump may be made to remove the oil from the well at approximately the same rate at which the oil flows into the well from the surrounding formation, and if so selected, the well will be operated at its maximum capacity. However, oil coming from the formation contains relatively large quantities of gas which, due to the pressure of the oil, cannot readily escape and is drawn into the pump with the oil, thereby reducing the liquid volumetric efficiency of the pump.

I have discovered a ready means for ascertaining the pressure existing at the pump entrance or at any other point below the surface of the standing column of well fluid in any given well without requiring the removal of the pump or any of its parts, and I have also discovered a ready method for determining the density of the well fluid, the information so obtained being used to select the location of the pump at the most desirable level and for use in determining the production capacity of the well.

To obtain the information required, I measure or determine the stable location of the fluid surface of the "standing column" of fluid within the well when the pump is operating at its normal production capacity and with the pressure of gas within the casing at the usual or normal value maintained during the usual or normal pumping operations at the well. The expression "standing column" as used herein is intended to mean the column of well fluid which stands in the well as distinguished from the pumped liquid column which is being lifted to the ground surface by the pump, such standing column being known in the oil industry as the "dead" fluid column, and with the usual type of pumping apparatus this standing column lies in the annular space between the tubing 5 and the casing 1.

This location of the fluid level may be readily accomplished by employing the methods and apparatus disclosed in United States Letters Patent No. 2,047,974, issued to Harold T. Wyatt and Paul E. Lehr, July 21, 1936, and in United States Letters Patent No. 2,156,519, issued to me on May 2, 1939, and in my copending application Serial No. 164,534, filed September 18, 1937. While the methods and apparatus are completely disclosed in the said patents and application, the method may be stated briefly as including the introduction into the annular space between the tubing 5 and the well casing of a sudden change in pressure in the well casing and measuring the length of time elapsing between the production of this pressure impulse and the return to the ground surface of the echo thereof from the surface of the fluid. Noting the distance from the ground surface of the fluid level under these conditions and noting the pressure of gas at the casing head, as by means of a pressure gage 13, the pressure on the fluid surface may be computed as follows: To the casing head pressure is added the effect of pressure on the fluid surface exerted by the weight of the column of gas between the fluid surface and the casing head. A gravity test may be made of the gas at the casing head which will determine the pressure exerted by each foot or hundred feet of height of the gas column. This information may be computed by the following formula which is by Dice:

$$\text{Log}_{10}\, Pb = \frac{SD}{122.82T} + \text{Log}_{10}\, Pt$$

Where $Pb$=Lbs./sq. in. absolute at bottom of gas column.
$Pt$=Lbs./sq. in. absolute at top of gas column.
S=Specific gravity of the gas (air is considered 1).
D=Depth from casing head to fluid surface.
T=Mean temp. of the gas column in degrees F. absolute.

Figure 3:
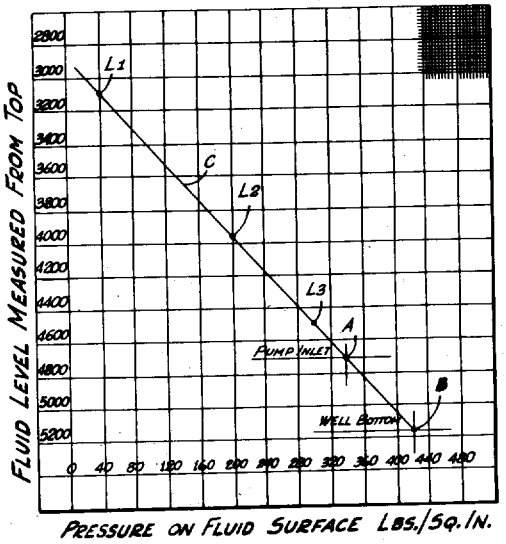
Fig. 3 is a diagrammatic view illustrating a chart or graph which may be employed in the practice of my method for the computation of fluid density and pressures at different locations or levels within the well.

This information may then be plotted upon a graph or chart as illustrated in Fig. 3 in which the conditions existing in the particular well under measurement are assumed to be such that with a pressure of 36 pounds per square inch at the casing head, the fluid surface is found to lie at 3100 feet below the casing head. The specific gravity of the gas in this instance may be found to be such that the effect will be to produce 4 pounds per square inch pressure on the fluid surface. Thus, the addition of 36 pounds and 4 pounds produces a total pressure on the fluid surface of 40 pounds per square inch. By arranging the chart shown in Fig. 3 with the ordinates representing the fluid level measured from the ground surface and the abscissae representing pressure on the fluid surface in pounds per square inch, the point L1 determined from the preceding formula may be plotted on the chart shown in Fig. 3.

Figure 2:
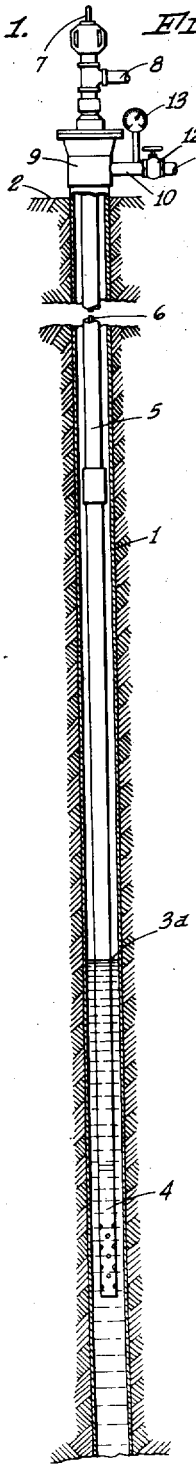
Fig. 2 is a view similar to Fig. 1 but illustrating the effect on the fluid surface of gas pressure allowed to build up in the casing.

Now the valve 12 is closed or a suitable pressure regulator is placed in the gas line 11 and the pressure within the casing is allowed to build up to any predetermined value. As the pressure builds up, the fluid level 3 tends to recede, the pump drawing down the fluid column until a stable condition of production and fluid level is reached under the new gas pressure. By continuing the operations of the pump during the building up of this pressure, preferably for a period substantially equal to three times the length of time required for the pump to remove the column of fluid between the original fluid level and a new fluid level to which the pressure depresses the fluid surface, represented at 3a (Fig. 2), a stable condition will be achieved at which the fluid level will become constant and the production by the pump will be approximately the same as before the pressure was allowed to build up in the casing. When this stable condition is reached, a second measurement of the fluid level is obtained by the level measuring methods and apparatus hereinbefore described.

Having determined the new location of the fluid surface, the pressure exerted thereon may now be calculated as follows: Assuming that the casing head pressure in this instance was adjusted to 170 pounds, to this should be added the pressure due to the weight of the column of gas above the new fluid level. The determination of the effect of the weight of the column of gas upon the fluid level may be obtained either by calculation or may be plotted out and obtained from suitable charts prepared for this purpose. In this instance, it may be assumed that the pressure due to the gas column is 30 pounds per square inch, making a total of 200 pounds per square inch on the fluid surface. Now, assuming that the level to which the standing column of fluid has receded is 3966 feet from the top of the well, the new point L2 on the chart shown in Fig. 3 representing the new level and the pressure on the fluid surface may be placed upon the chart.

From an exhaustive series of actual tests I have discovered that in any given well which is being produced by a mechanical pump and where the cross sectional area of the standing fluid column is constant, there is a constant relation between a change in the pressure upon the fluid surface and the corresponding change in the location of the stable fluid surface for any given rate of production. This result follows from the fact, as I have discovered, that even though large quantities of gas bubbles are usually flowing vertically through the fluid column in a pumping well, the density of the gas and oil mixture in the column is constant throughout the height of the column. This is contrary to the usual concept of the fluid density in producing oil wells as heretofore it has been possible to explore, usually with a pressure recorder, the density of the fluid in flowing wells only. These measurements are usually made in the flowing column of fluid where, on account of gas breaking out of the liquid as it flows up to regions of lower pressure, the fluid density is found to increase with the depth to which the pressure recorder is run in the column. Under equilibrium conditions in wells being produced by mechanical pumps there is evidently very little gas liberated from the liquid in the standing column, therefore the volume of gas which enters the column at the bottom is practically the same as that given off at the top. The constant density phenomena which I have discovered appears to be due to the fact that the size of the gas bubbles decreases, and their density increases with their depth in the fluid column. They therefore travel much slower near the bottom than they do near the top of the fluid column where they are large and light. At the bottom therefore there are many small heavy gas bubbles traveling close together vertically upward at a slow rate whereas as these same bubbles approach the top of the column they become very large and light and travel at a high speed and are farther apart. The relations of bubble size, weight and velocity at different levels in the fluid column are evidently such that the proportions of gas and liquid are constant throughout the height of the column and the density does not change.

It follows therefore that an increase in pressure on the surface of the fluid column will cause the column to recede through a distance directly proportional to the increase in pressure. Hence a line drawn on the chart shown in Fig. 3 intersecting the points L1 and L2 will truly represent the fluid level at any of the pressures which may be placed upon the column. Thus by merely extending the line C downwardly on the chart until it crosses the ordinate representing the location of the pump inlet indicated on the chart as A, a direct reading may be made from the chart of the pressure on the fluid surface which would be required to cause the surface of the column to recede to the pump inlet. On the chart this is represented as 336 pounds per square inch, which is the pressure exerted by the well fluid in that particular well at the pump entrance for the normal casing pressure and normal rate of production, assuming that the rate of production was normal during these tests.

The actual pressure in the column of fluid at the pump inlet may, however, be calculated from the information received by the two fluid level tests described above. That is, by subtracting the original fluid level from the new fluid level, the total difference in level will be found, in this instance 866 feet. Then by subtracting the original pressure on the fluid surface from the new pressure on the fluid surface, a difference of 160 pounds per square inch is found to have been necessary to cause the fluid column to recede 866 feet. By dividing the difference in fluid pressure by the difference in surface level, the density of the mixture of oil and gas in the well (that is, the pressure exerted by this mixture per unit of height of the column of the mixture) may be found. In this instance, the column receded a distance between 3100 feet and 3966 feet, or a total distance of 866 feet, while the pressure difference is 160 pounds. The density of the fluid in the column is such therefore as to exert 0.185 pound per square inch per foot of height of the column.

Hence, knowing the pressure on the fluid surface at any level thereof and knowing the distance below this surface at which the pump inlet is located, a direct calculation of the fluid pressure at the pump inlet may be obtained by the following formulae:

The pressure at any point below the normal surface level in a well at which the level can be maintained by means of gas pressure in the casing is $$PL1=Pc1+Pg1 \text{ and } PL2=Pc2+Pg2$$

The density of the fluid for the rate of production during the tests is $$D=\frac{PL2-PL1}{L2-L1}=\text{density of the fluid in lbs. per sq. in. per foot of fluid.}$$

The pressure at the pump is $$Pa=D(La-L2)+PL2$$

Where

Pc1=gage casing pressure to maintain fluid at level L1.
Pc2=gage casing pressure to maintain fluid at level L2.
Pg1=pressure exerted upon fluid surface by weight of gas above it at level L1.
Pg2=ditto for level L2.
PL1=pressure on the fluid surface at level L1.
PL2=pressure on the fluid surface at level L2.
L1=fluid level corresponding to Pc1.
L2=fluid level corresponding to Pc2.
La=pump location in feet from ground surface.
Pa=pressure at the pump.

In the example shown in Fig. 3, assuming the inlet to the pump is located at the 4700 foot level, the pressure of the fluid at this point would be equal to the sum of the gas pressure at the casing head for level L2, the pressure exerted by the column of gas above the fluid surface corresponding to this level and the pressure exerted by the column of fluid above the pump inlet. In this instance, the pressure at the casing head is assumed to be 170 pounds per square inch, the effect of the column of gas at this pressure with the fluid level at 3966 feet from the surface being 30 pounds per square inch and the effect of the column of fluid above the pump inlet being 734 feet at 185 pounds per square inch per foot, or 135.5 pounds per square inch exerted by the column of fluid, the result being 335.5 pounds per square inch pressure at the pump entrance. This result is clearly illustrated in Fig. 3 by the point A, the point A being located at 335.5 mark on the abscissae of the chart.

If desired, an estimation of the bottom hole pressure may also be made by continuing the line C downwardly on the chart to intersect the ordinate representing the bottom of the well, such point being indicated at B, or the pressure at any other level in the well below the surface of the well fluid for the rate of production at which the tests were made may be located along the line C. I have discovered that in wells employing mechanical pumps for any given production rate by the pump, the density of the oil-and-gas mixture is constant throughout the height of the standing column of fluid in the annular space between the tubing and casing so that the line C once established continues as a straight line, the effect in pressure per unit of height of the column being constant throughout the height of the column.

Knowing the density of the well fluid and the pressure exerted at the pump inlet, the operator of any particular well may determine whether or not it is practicable to increase the amount of liquid being produced. If the volumetric efficiency of the pump is low and the tests indicate considerable pressure at the pump, he may raise the pump to a level indicated upon the line C at which better separation of gas will usually occur prior to entry of liquid into the pump.

The utilization of the information obtained by the foregoing method will also accurately produce the information of the maximum potential production of the well as by comparing the pressure of the fluid at the pump under two or more different operating conditions of the pump. For example, the static fluid pressure at the pump when the pump is not operating may be measured and compared with the fluid pressure at the pump when the pump is operating at its normal rate of production or at any other rate of production, a comparison of the two values so obtained will produce a constant, indicating the ratio between the rates of production and pressure at the pump inlet, so that by employing this constant at a theoretical zero pump inlet pressure (which would represent the fluid being removed from the well at the rate it flows into the well from the formation) the maximum potential capacity of the well may be found.

Employing the method of determining fluid pressure at the pump hereinbefore described, the static pressure may be readily obtained without necessitating the use of pressure recorders or other devices requiring the removal of or alteration of any of the pumping mechanism and the measurement may be made in wells which have been shut down as readily as in wells which are actively producing.

To obtain the fluid pressure at any point at or below the fluid surface when the pump is not producing fluid, the casing should be closed in and the gas escaping from the well fluid should be allowed to build up pressure in the casing until a stable condition is reached, that is, a point is reached at which no more gas is made by the well (no more gas escapes from the well fluid). When this point is reached, the remaining well fluid in the well may be considered as dense liquid.

Now, by determining the height of the fluid surface under these conditions by my method, the pressure on the fluid surface may be readily determined and by adding thereto the effect of the weight of the column of fluid above any given level, the fluid pressure at that level may be found. This information alone is extremely useful to the operators of producing wells.

The information thus obtained may be plotted on a graph or chart such as that shown in Fig. 4, wherein the ordinates represent fluid pressure at the pump inlet in pounds per square inch and the abscissae represent rate of production of oil from the particular well under consideration, and the static pressure may be plotted at zero production, as indicated by the point D in Fig. 4.

The casing pressure may now be reduced and the pump started and allowed to assume a predetermined rate of production, preferably its normal rate. Assuming this rate is 200 barrels of oil per day, a new determination of the fluid pressure at the pump is made at this rate of production. That is, the pump is started and allowed to operate until the fluid level in the well reaches a stable condition. The location of the fluid level and the pressure in pounds per square inch at the pump inlet under these conditions are determined by the method hereinbefore described and the fluid pressure at the pump is plotted against the production rate on the chart shown in Fig. 4. Assuming that this new pressure at 200 barrels per day is found to be at the point indicated in Fig. 4 at E, a straight line drawn between the points D and E will intersect the zero pressure ordinate at a point representing the maximum potential capacity of the well. In the diagram shown in Fig. 4, this maximum potential production capacity is found to be 300 barrels per day. In other words, if a pump of sufficient capacity is installed in this well and operated in such manner as to remove 300 barrels per day, the oil will be removed at the same rate at which it flows into the well from the formation.

A more accurate determination of the maximum potential production capacity of the well may be made by comparing the fluid pressure at the pump under two different actual producing conditions of the pump, such as by measuring the fluid pressure at the pump when the pump is operating at one production rate, for example, its normal rate, and then changing the rate of production of the pump as by slowing the pump down or changing the stroke of the pump and plotting the relation between the new production rate and the fluid pressure measured by my method, as set forth herein, it will be found that a line intersecting these two points will also represent the relation between production rate and fluid pressure at the pump at any rate of the production by the pump.

As shown in Fig. 5, the normal production rate of 200 barrels per day plotted against the fluid pressure at the pump in pounds per square inch may be represented upon the chart by the point G while at a reduced rate of production at the pump, say to 100 barrels per day, it will be found that the fluid pressure at the pump is increased so that by determining the fluid pressure under these conditions, the relation between the reduced production rate and the fluid pressure at the pump may be plotted by the point H. A straight line interconnecting the points H and G will intersect the zero pressure ordinate at a point therealong, indicating a maximum possible production of 300 barrels per day. In making such determinations, however, it is desirable that the rate of production of the pump be reduced to at least two-thirds of its normal production rate and preferably to 50% of its normal production rate in order to obtain substantially widely separated points H and G.

Again, it will be noted that all of the necessary calculations to determine the maximum production possible of the well may be made without interrupting the normal production conditions at the well and without requiring the laborious efforts of removing and replacing any of the pump mechanisms.

It will therefore be observed that I have provided a ready method for determining the density of the fluid in any particular well and also for the determination of the fluid pressure at the pump without requiring the removal or alteration of any of the usual mechanism found in the well. It will also be noted that I have provided a ready method for graphically determining the fluid pressure at the pump by first determining the amount of recession of the fluid level due to changes in gas pressure exerted upon the fluid surface and plotting this information upon a graph or chart and extending a straight line intersecting the two or more points so located to a point on the chart representing the level of the pump inlet.

It will also be noted that I have devised a ready means for utilizing the information obtained with respect to fluid levels and gas pressures at the casing head for mathematically determining the fluid pressure at the pump and also for utilizing this information to determine accurately the potential production of any well measured. It should also be noted that all of the measurements necessary to provide for the computations and calculations explained herein may be accomplished without interrupting the operation of the pump except for the measurement of the static pressure as described herein.

While I have shown and described the preferred embodiment of my invention, I do not desire to be limited to any of the details illustrated or described herein, except as defined in the appended claims.

I claim:

1. The method of determining the density of the standing column of fluid in a well, which comprises measuring the stable level of the fluid column under one condition of gas pressure, changing the pressure of gas within the well to move the surface of the fluid column to a new stable level, measuring the new stable level and dividing the change in pressure on the fluid surface required to achieve the new level by the difference in height between the two levels.

2. The method of determining the density of fluid in a well having a casing and a pump suspended therein on tubing and without requiring removal of pump parts, which consists in determining the fluid level in the annular space between the pump tubing and the casing under one condition of pressure, changing the pressure of the gas within the well to move the fluid surface to a new stable level, measuring the new level and dividing the change in pressure on the fluid surface required to achieve the new level by the difference between the two levels.

3. The method of determining the density of the standing column of fluid in a well having a casing and a pump suspended therein, which consists in measuring the level of the standing column of fluid in the well while the pump therein is operated at a given rate of production and under a known condition of gas pressure on the surface of the fluid column, changing the gas pressure on the fluid column, continuing the operation of the pump at the same production rate until the level of the standing column becomes stable at a new location, measuring the new level and comparing the difference in the pressures exerted on the fluid surface at the two levels within the difference in height of the two levels.

4. The method of determining the density of the standing column of fluid in a well having a casing and a pump suspended therein, which consists in measuring the stable level of the surface of the standing column of fluid under one condition of pressure of gas released by the well, measuring the pressure on said fluid surface under said one condition of gas pressure, regulating the flow of gas from the well to increase the pressure of said gas to a different value to depress the surface of said standing column to a new stable level, measuring the new level, measuring the pressure on the fluid surface at the new level, and comparing the difference in the pressures exerted upon the fluid surface under the two conditions of gas pressure with the difference in height of the levels of the fluid surface under the two pressure conditions.

5. The method of determining the density of the standing column of fluid in an oil well having a casing and a mechanical pump suspended therein upon pump tubing and without requiring the removal of pump parts, which consists in the steps of operating the pump under one stable condition of gas pressure in the casing until the fluid level becomes stable, measuring the distance between the casing head and the surface of the fluid under this stable condition, altering the casing pressure to a new condition, operating the pump at the same rate of production under the new condition of gas pressure to again stabilize the fluid level, measuring the distance between the casing head and the new level of the fluid surface under said new stable condition, and measuring the casing head pressures under the two stable conditions, whereby the pressure exerted by the fluid per unit of height of the fluid is represented by comparing the difference in height of the fluid surface levels and the difference between the pressures on the fluid surface required to maintain the fluid surface at the two levels.

6. In a well having a casing and a pump suspended therein, the method of determining the unknown pressure exerted in the standing column of fluid in the well at any desired level below the normal surface of said column and without requiring the removal of any of the pump parts, which comprises measuring the actual stable level of the fluid column under one known condition of gas pressure in the casing, determining the pressure on the fluid surface at that level, changing the pressure of gas in the well to move the surface of said column to a new actual stable level, measuring the new level of the fluid surface, determining the pressure on the fluid surface at the new level, determining the density of the fluid by dividing the change in pressure on the fluid surface required to achieve the new level by the difference in height of the two levels, and computing the unknown pressure at the desired level by adding to the pressure on the fluid surface at either of the levels the effect in pressure of the column of fluid of the density so determined between the selected actual level and the desired level.

7. In a well having a casing and a pump suspended therein, the method of determining the unknown pressure exerted in the standing column of fluid at any desired level below the normal surface of said column while the pump is operating to remove fluid from the well, which comprises measuring the actual stable level of the fluid under one known condition of gas pressure in the well by sonic sounding method, determining the pressure on the fluid surface at that level, changing the pressure of the gas in the well to move the surface of the column to a new actual level, continuing to operate the pump at the same production rate as for the first condition of gas pressure in the well until the fluid level again becomes stable, measuring the new stable level and determining the pressure upon the fluid surface at this new level, determining the pressure exerted per unit of height of the fluid column by dividing the change in gas pressure on the fluid surface required to effect the change in the fluid level by the difference in height of the two levels, and computing the unknown pressure at the desired level by adding to the gas pressure upon the fluid surface at either of the actual levels the effect in pressure of the fluid column between the selected actual level and the desired level.

8. The method of determining the potential production capacity of a well having a casing and a pump suspended therein, which comprises measuring the stable level of the surface of the standing column of fluid in the well at one known rate of production and under one known condition of gas pressure in the well, determining the pressure on the surface of the fluid column at that level, changing the gas pressure in the well to move the surface of the fluid column to a new stable level, measuring the level of the fluid surface under the new gas pressure condition and determining the pressure on the fluid surface at the new level, dividing the change in pressure on the fluid surface by the difference in height between the two levels to thereby determine the density of the fluid in the column at that rate of production, determining the pressure at some predetermined desired point below the normal fluid surface for that rate of production by adding to the pressure on the fluid surface for either of the measured levels the effect in pressure of the column of fluid between that level and the predetermined desired point, then changing the rate of production by the pump and repeating the fluid level change and gas pressure determinations to determine the density of the fluid in the column and the pressure of the fluid at the said predetermined desired point for the new rate of production and then dividing the difference in the two production rates by the difference in the corresponding fluid pressures at the desired point and using the ratio thus found to determine the maximum rate at which the well is capable of being produced.

9. The method of ascertaining the pressure exerted by the well fluid at any point below the normal surface thereof, which comprises: determining the location of the fluid surface under one condition of pressure of gas on the surface, determining said gas pressure under said one condition, changing the gas pressure to move the fluid surface to a new stable level, determining the new gas pressure on the fluid surface, determining the location of the new surface level and comparing the difference in said gas pressures with the corresponding change in height of the surface level to determine the relation between them, whereby the gas pressure on the fluid surface which is required to maintain the fluid surface at any selected point may be ascertained and which pressure represents the normal pressure exerted in the fluid at said point.

10. The method of ascertaining the pressure exerted by the well fluid at any point below the surface thereof while a mechanical pump is operating in that well, which comprises: determining the stable location of the fluid surface under one condition of gas pressure in the casing of the well; determining the gas pressure on the fluid surface at that level; changing the pressure of gas in the casing to move the fluid surface to a new stable level; determining the new location of the fluid surface; determining the gas pressure on the surface at the new level; and comparing the difference between the pressures on the surface with the corresponding change in the height of the fluid surface to thereby determine the relation between changes in pressure on the fluid surface and the corresponding changes in the location of said fluid surface from which relation the pressure at any selected point may be ascertained.

11. The method of determining the potential production capacity of a well having a casing and a pump suspended therein, which comprises: determining the pressure exerted by the well fluid at some selected point below the normal surface thereof under one known rate of production, by determining the location of the fluid surface under one condition of gas pressure on the surface, determining the gas pressure on the fluid surface under said one condition, changing the gas pressure to move the fluid surface to a new stable level under the same production rate, determining the new gas pressure on the fluid surface, determining the location of the new surface level, comparing the difference in said gas pressures with the corresponding change in height of the surface level, to thereby ascertain the pressure exerted at said selected point under said one rate of production; changing the rate of production from said well; repeating the steps of determining the location of the fluid surface at two stable levels and the gas pressures on said surface to maintain said levels under the new production rate to ascertain the pressure exerted at the same selected point; and comparing the difference in the production rates with the corresponding difference in pressures at said selected point to determine their relation from which the maximum rate of production from the well may be determined.

CRANFORD P. WALKER.